US010283091B2

(12) United States Patent
Wu et al.

(10) Patent No.: US 10,283,091 B2
(45) Date of Patent: May 7, 2019

(54) BUFFER OPTIMIZATION

(71) Applicant: Microsoft Technology Licensing, LLC, Redmond, WA (US)

(72) Inventors: Yongjun Wu, Bellevue, WA (US); Shyam Sadhwani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 14/661,643

(22) Filed: Mar. 18, 2015

(65) Prior Publication Data

US 2016/0104457 A1    Apr. 14, 2016

Related U.S. Application Data

(60) Provisional application No. 62/063,220, filed on Oct. 13, 2014.

(51) Int. Cl.
*G09G 5/39*    (2006.01)
*G06T 15/00*    (2011.01)
(Continued)

(52) U.S. Cl.
CPC ............. *G09G 5/39* (2013.01); *G06F 9/5011* (2013.01); *G06F 9/5044* (2013.01);
(Continued)

(58) Field of Classification Search
CPC .......... G06T 1/20; G06T 15/005; G06T 1/60; H04N 21/43615; H04N 21/44004;
(Continued)

(56) References Cited

U.S. PATENT DOCUMENTS 5,379,356 A * 1/1995 Purcell ..................... G09G 5/39
348/E5.077
5,506,604 A    4/1996 Nally et al.
(Continued)

FOREIGN PATENT DOCUMENTS

CN    103826129    5/2014

OTHER PUBLICATIONS

"International Search Report and Written Opinion", Application No. PCT/US2015/055051, dated Dec. 9, 2015, 12 pages.
(Continued)

*Primary Examiner* — Devona E Faulk
*Assistant Examiner* — Charles L Beard
(74) *Attorney, Agent, or Firm* — Newport IP, LLC; Jacob P. Rohwer

(57) ABSTRACT

Buffer optimization techniques are described herein in which a graphics processing system is configured to implement and select between a plurality of buffer schemes for processing of an encoded data stream in dependence upon formats used for decoding and rendering (e.g., video format, bit depth, resolution, content type, etc.) and device capabilities such as available memory and/or processing power. Processing of an encoded data stream for display and rendering via the graphics processing system then occurs using a selected one of the buffer schemes to define buffers employed for the decoding and rendering, including at least configuring the sizes of buffers. The plurality of schemes may include at least one buffer scheme for processing the encoded content when the input format and the output format are the same, and a different buffer scheme for processing the encoded content when the input format and the output format are different.

19 Claims, 6 Drawing Sheets

(51) Int. Cl.
  *G06T 1/20* (2006.01)
  *H04N 21/436* (2011.01)
  *H04N 21/44* (2011.01)
  *H04N 21/4402* (2011.01)
  *H04N 21/45* (2011.01)
  *G06F 9/50* (2006.01)

(52) U.S. Cl.
  CPC .............. *G06F 9/5055* (2013.01); *G06T 1/20* (2013.01); *G06T 15/005* (2013.01); *H04N 21/43615* (2013.01); *H04N 21/4402* (2013.01); *H04N 21/44004* (2013.01); *H04N 21/440218* (2013.01); *H04N 21/4516* (2013.01); *G09G 2360/18* (2013.01)

(58) Field of Classification Search
  CPC ....... H04N 21/4402; H04N 21/440218; H04N 21/4516; H04N 21/44; H04N 21/44008; G09G 5/39; G09G 2360/18; G06F 9/5011; G06F 9/5022
  See application file for complete search history.

(56) References Cited

U.S. PATENT DOCUMENTS

| | | | |
|---|---|---|---|
| 5,566,208 A * | 10/1996 | Balakrishnan | H04N 21/23406 370/468 |
| 5,691,768 A * | 11/1997 | Civanlar | G06T 3/40 375/240.01 |
| 5,717,816 A * | 2/1998 | Boyce | H04N 21/44004 375/E7.013 |
| 5,729,303 A * | 3/1998 | Oku | H04N 5/4401 348/423.1 |
| 5,841,953 A * | 11/1998 | Rohatgi | H03M 7/425 358/1.15 |
| 5,847,762 A * | 12/1998 | Canfield | H04N 19/61 375/240.15 |
| 5,887,115 A * | 3/1999 | Boyce | G11B 5/0086 348/E5.007 |
| 5,901,277 A * | 5/1999 | Chu | G06T 9/00 358/1.15 |
| 5,903,282 A * | 5/1999 | Schoner | G06T 1/60 345/558 |
| 5,915,265 A * | 6/1999 | Crocker | G06F 12/0223 711/170 |
| 5,937,138 A * | 8/1999 | Fukuda | G11B 20/00007 348/E5.112 |
| 5,956,088 A * | 9/1999 | Shen | H04N 21/2365 370/477 |
| 6,016,365 A * | 1/2000 | Shin | H04N 19/105 375/E7.027 |
| 6,160,915 A * | 12/2000 | Kato | H04N 21/23406 348/446 |
| 6,223,181 B1 * | 4/2001 | Goldberg | G06T 3/602 |
| 6,226,038 B1 | 5/2001 | Frink et al. | |
| 6,256,045 B1 | 7/2001 | Bae et al. | |
| 6,262,776 B1 * | 7/2001 | Griffits | H04N 5/04 348/512 |
| 6,275,267 B1 * | 8/2001 | Kobayashi | H04N 5/44504 348/555 |
| 6,397,251 B1 * | 5/2002 | Graf | H04L 29/06027 348/E5.008 |
| 6,658,198 B1 * | 12/2003 | Willis | G11B 20/10527 386/326 |
| 6,697,871 B1 * | 2/2004 | Hansen | H04L 69/22 370/392 |
| 6,707,463 B1 * | 3/2004 | Gibson | G06F 9/3879 345/501 |
| 6,775,274 B1 * | 8/2004 | Ain | H04L 63/0428 370/360 |
| 7,085,379 B1 * | 8/2006 | Kagechi | H04N 1/64 375/E7.026 |
| 7,139,241 B1 * | 11/2006 | Gazit | H04L 29/06027 370/231 |
| 7,286,186 B2 | 10/2007 | Lee | |
| 7,388,992 B2 * | 6/2008 | Atsumi | H04N 1/33307 375/E7.131 |
| 7,421,508 B2 | 9/2008 | Hannuksela et al. | |
| 7,508,398 B1 * | 3/2009 | Montrym | G06T 1/60 345/545 |
| 7,536,469 B2 * | 5/2009 | Chou | H04N 21/23406 709/231 |
| 7,644,335 B2 * | 1/2010 | Luby | G06F 17/16 714/752 |
| 7,746,401 B2 * | 6/2010 | Wu | G03B 17/54 348/333.01 |
| 7,903,743 B2 * | 3/2011 | Ho | H04N 19/61 375/240.25 |
| 8,107,744 B2 | 1/2012 | Tian et al. | |
| 8,194,707 B2 * | 6/2012 | Chen | H04L 47/12 370/235 |
| 8,243,086 B1 * | 8/2012 | Diard | H04N 19/91 345/426 |
| 8,254,701 B1 * | 8/2012 | Diard | G06T 9/001 382/232 |
| 8,295,621 B1 * | 10/2012 | Diard | G06T 9/001 382/232 |
| 8,301,794 B2 | 10/2012 | Salomons | |
| 8,327,046 B1 | 12/2012 | Sha et al. | |
| 8,374,238 B2 | 2/2013 | Xiong et al. | |
| 8,441,487 B1 * | 5/2013 | Everitt | G06T 9/00 345/501 |
| 8,497,788 B1 * | 7/2013 | Miller | H03M 7/30 341/51 |
| 8,587,723 B2 * | 11/2013 | Nakajima | H04B 1/205 348/552 |
| 8,612,643 B2 * | 12/2013 | Rangarajan | G06F 9/544 709/212 |
| 8,693,538 B2 | 4/2014 | Eleftheriadis et al. | |
| 8,782,270 B2 | 7/2014 | Sathianathan et al. | |
| 8,823,507 B1 * | 9/2014 | Touloumtzis | H04L 67/24 340/501 |
| 8,913,658 B2 * | 12/2014 | Tripathi | H04N 19/149 375/240.03 |
| 8,982,942 B2 * | 3/2015 | Gao | G10L 25/69 370/252 |
| 9,053,752 B1 * | 6/2015 | Masterson | G11B 27/30 |
| 9,058,792 B1 * | 6/2015 | Edmondson | G09G 5/363 |
| 9,124,650 B2 * | 9/2015 | Maharajh | G06F 21/10 |
| 9,161,030 B1 * | 10/2015 | Masterson | H04N 5/44504 |
| 9,196,014 B2 * | 11/2015 | Huang | G06T 1/60 |
| 9,196,216 B2 * | 11/2015 | Yu | G09G 5/393 |
| 9,307,188 B2 * | 4/2016 | O'Mahony | H04N 21/8358 |
| 9,426,495 B2 * | 8/2016 | Sullivan | H04N 19/44 |
| 9,491,505 B2 * | 11/2016 | Wang | H04N 21/4307 |
| 9,571,780 B2 * | 2/2017 | Koo | G09G 5/006 |
| 9,654,531 B2 * | 5/2017 | Hoffert | H04L 65/60 |
| 9,674,714 B2 * | 6/2017 | Francisco | H04W 24/02 |
| 9,704,215 B2 * | 7/2017 | Kim | G09G 5/006 |
| 10,037,366 B2 * | 7/2018 | Sadovsky | G06F 17/30371 |
| 10,043,425 B2 * | 8/2018 | Brunner | G02F 1/1309 |
| 10,108,462 B2 * | 10/2018 | Choe | G06F 9/5077 |
| 10,114,630 B2 * | 10/2018 | Raman | G06F 8/65 |
| 2002/0059643 A1 * | 5/2002 | Kitamura | H04N 5/4401 725/136 |
| 2003/0031252 A1 * | 2/2003 | Miyazawa | H04N 7/52 375/240.07 |
| 2003/0035065 A1 * | 2/2003 | Kim | H04N 21/440218 348/558 |
| 2003/0053416 A1 * | 3/2003 | Ribas-Corbera | H04N 19/172 370/233 |
| 2003/0126293 A1 * | 7/2003 | Bushey | G06F 17/30905 709/246 |
| 2004/0039867 A1 * | 2/2004 | Apfeldorfer | G06F 5/10 711/1 |
| 2004/0090539 A1 * | 5/2004 | Kim | H04N 5/772 348/231.1 |
| 2004/0162911 A1 * | 8/2004 | Sperschneider | G10L 19/24 709/231 |

(56) References Cited

U.S. PATENT DOCUMENTS

| | | | |
|---|---|---|---|
| 2004/0218094 A1* | 11/2004 | Choi | H04N 5/46 348/441 |
| 2004/0268329 A1* | 12/2004 | Prakasam | H04N 19/91 717/141 |
| 2005/0030569 A1* | 2/2005 | Tabata | H04N 1/41 358/1.13 |
| 2005/0104753 A1* | 5/2005 | Dror | H03M 7/40 341/51 |
| 2005/0172009 A1* | 8/2005 | Roh | H04L 47/10 709/219 |
| 2005/0201471 A1* | 9/2005 | Hannuksela | H04N 21/23406 375/240.25 |
| 2005/0286631 A1* | 12/2005 | Wu | H04N 19/176 375/240.12 |
| 2006/0045358 A1* | 3/2006 | Jodra | H04N 1/3871 382/232 |
| 2006/0056716 A1* | 3/2006 | Komeno | H04N 5/44504 382/233 |
| 2006/0072597 A1* | 4/2006 | Hannuksela | H04N 21/23406 370/412 |
| 2006/0109856 A1* | 5/2006 | Deshpande | H04L 29/06027 370/412 |
| 2006/0120463 A1* | 6/2006 | Wang | H04N 19/70 375/240.25 |
| 2006/0288397 A1* | 12/2006 | Uchida | H04N 21/231 725/115 |
| 2007/0086521 A1 | 4/2007 | Wang et al. | |
| 2007/0110396 A1* | 5/2007 | Itoh | G11B 20/10527 386/247 |
| 2007/0172118 A1* | 7/2007 | Pan | H04N 1/58 382/162 |
| 2007/0196023 A1* | 8/2007 | Hama | H04N 1/41 382/232 |
| 2007/0202810 A1* | 8/2007 | Kondo | H04W 28/14 455/66.1 |
| 2007/0204164 A1* | 8/2007 | Cattrone | H04N 1/32101 713/176 |
| 2007/0274393 A1* | 11/2007 | Toma | G11B 27/3027 375/240.23 |
| 2008/0055190 A1* | 3/2008 | Lee | H04N 21/4122 345/2.1 |
| 2008/0137735 A1* | 6/2008 | Kamariotis | H04N 19/159 375/240.03 |
| 2008/0177893 A1 | 7/2008 | Bowra | |
| 2008/0256332 A1* | 10/2008 | Fuin | G06F 8/4434 712/41 |
| 2009/0002379 A1* | 1/2009 | Baeza | G06T 1/20 345/522 |
| 2009/0003447 A1* | 1/2009 | Christoffersen | H04N 19/61 375/240.16 |
| 2009/0060047 A1* | 3/2009 | Schneider | H03M 7/40 375/240.23 |
| 2009/0074308 A1* | 3/2009 | Sasaki | H04N 19/426 382/232 |
| 2009/0086816 A1* | 4/2009 | Leontaris | H04N 19/80 375/240.03 |
| 2009/0122864 A1* | 5/2009 | Palfner | H04N 19/176 375/240.12 |
| 2009/0141894 A1* | 6/2009 | Sahdra | H04N 21/4104 380/239 |
| 2009/0147840 A1* | 6/2009 | Sahdra | H04N 5/76 375/240.01 |
| 2009/0183197 A1* | 7/2009 | Matthews | H04N 21/23424 725/32 |
| 2009/0238279 A1* | 9/2009 | Tu | H04N 19/30 375/240.16 |
| 2009/0316782 A1* | 12/2009 | Hosokawa | H04N 21/42692 375/240.13 |
| 2009/0322784 A1* | 12/2009 | Sartori | H04N 21/426 345/619 |
| 2010/0111167 A1* | 5/2010 | Wu | H04N 19/30 375/240.12 |
| 2010/0111497 A1* | 5/2010 | Song | H04N 21/4122 386/241 |
| 2010/0132002 A1* | 5/2010 | Henocq | H03M 13/03 725/118 |
| 2010/0135393 A1* | 6/2010 | Ying Gao | H04N 19/00315 375/240.15 |
| 2010/0141489 A1* | 6/2010 | Reznik | H03M 7/40 341/67 |
| 2010/0189181 A1* | 7/2010 | Zheng | H04N 19/70 375/240.24 |
| 2010/0218232 A1* | 8/2010 | Rodriguez | H04N 7/17318 725/118 |
| 2011/0019747 A1* | 1/2011 | Hannuksela | H04N 21/23406 375/240.25 |
| 2011/0032856 A1* | 2/2011 | Ozawa | H04L 12/6418 370/310 |
| 2011/0216834 A1* | 9/2011 | Zhou | H04N 7/12 375/240.24 |
| 2011/0252287 A1* | 10/2011 | Kure | H04N 19/63 714/758 |
| 2011/0282948 A1* | 11/2011 | Vitaldevara | G06Q 10/10 709/206 |
| 2011/0283185 A1* | 11/2011 | Obasanjo | G06F 17/3089 715/243 |
| 2011/0289135 A1* | 11/2011 | Soldan | G06Q 30/0277 709/203 |
| 2011/0296023 A1* | 12/2011 | Ferris | G06F 9/541 709/226 |
| 2011/0314030 A1* | 12/2011 | Burba | G06F 17/30867 707/749 |
| 2011/0314380 A1* | 12/2011 | Pritchett | H04N 21/44012 715/723 |
| 2011/0314416 A1* | 12/2011 | Gibson | G06F 17/30867 715/810 |
| 2011/0320380 A1* | 12/2011 | Zahn | G06Q 30/0282 705/347 |
| 2012/0023249 A1* | 1/2012 | Chen | H04N 21/235 709/231 |
| 2012/0256924 A1* | 10/2012 | Uema | H04N 21/4122 345/428 |
| 2012/0258699 A1* | 10/2012 | Kim | H04W 52/0209 455/418 |
| 2012/0269448 A1* | 10/2012 | Kimura | H04N 19/60 382/233 |
| 2013/0003864 A1* | 1/2013 | Sullivan | H04N 19/44 375/240.25 |
| 2013/0007499 A1* | 1/2013 | Moy | G06F 3/1423 713/400 |
| 2013/0039180 A1* | 2/2013 | Hong | H04W 8/22 370/231 |
| 2013/0051478 A1* | 2/2013 | Wu | H04N 19/159 375/240.25 |
| 2013/0129324 A1* | 5/2013 | Uro | H04N 5/272 386/353 |
| 2013/0147822 A1* | 6/2013 | Yu | G09G 5/393 345/547 |
| 2013/0151567 A1* | 6/2013 | Ellison | G06F 17/30595 707/802 |
| 2013/0166580 A1* | 6/2013 | Maharajh | H04L 65/605 707/758 |
| 2013/0166772 A1* | 6/2013 | Tapio Kekki | H04N 21/47217 709/234 |
| 2013/0177076 A1* | 7/2013 | Itani | H04N 19/105 375/240.03 |
| 2013/0182186 A1* | 7/2013 | Ikenaga | H04N 5/38 348/723 |
| 2013/0251256 A1* | 9/2013 | Deng | G06T 9/00 382/166 |
| 2013/0279877 A1* | 10/2013 | Boak | H04N 5/917 386/231 |
| 2013/0293537 A1* | 11/2013 | Gaude | G06T 13/20 345/419 |
| 2013/0294526 A1 | 11/2013 | Thornberry | |
| 2013/0329008 A1* | 12/2013 | Takahashi | H04N 13/0048 348/43 |

(56) References Cited

U.S. PATENT DOCUMENTS

| | | | | |
|---|---|---|---|---|
| 2014/0028788 A1* | 1/2014 | Halavy | H04N 7/152 | 348/14.09 |
| 2014/0086326 A1* | 3/2014 | Dziecielewski | H04N 19/70 | 375/240.16 |
| 2014/0089469 A1* | 3/2014 | Ramamurthy | H04L 65/60 | 709/219 |
| 2014/0112383 A1* | 4/2014 | Yang | H04N 21/44 | 375/240.01 |
| 2014/0112394 A1* | 4/2014 | Sullivan | H04N 19/46 | 375/240.26 |
| 2014/0140400 A1* | 5/2014 | George | H04N 19/52 | 375/240.12 |
| 2014/0146885 A1* | 5/2014 | Park | H04N 21/42623 | 375/240.12 |
| 2014/0155090 A1* | 6/2014 | Khorashadi | H04W 4/04 | 455/456.2 |
| 2014/0159928 A1* | 6/2014 | Matsumura | H03M 7/40 | 341/67 |
| 2014/0168362 A1* | 6/2014 | Hannuksela | H04N 13/161 | 348/43 |
| 2014/0198122 A1* | 7/2014 | Grossman | G06T 11/001 | 345/582 |
| 2014/0204107 A1* | 7/2014 | Laksono | H04N 19/46 | 345/547 |
| 2014/0205017 A1* | 7/2014 | Guo | H04N 19/15 | 375/240.25 |
| 2014/0219361 A1* | 8/2014 | Wegener | H04N 19/46 | 375/240.24 |
| 2014/0232938 A1* | 8/2014 | Mody | H04N 21/234309 | 348/469 |
| 2014/0253563 A1* | 9/2014 | Koneru | G06T 1/20 | 345/501 |
| 2014/0269899 A1* | 9/2014 | Park | H04N 19/44 | 375/240.02 |
| 2014/0269927 A1* | 9/2014 | Naletov | H04N 19/00472 | 375/240.18 |
| 2014/0294094 A1* | 10/2014 | Wu | H04N 21/234309 | 375/240.26 |
| 2014/0310348 A1* | 10/2014 | Keskitalo | H04L 65/4084 | 709/204 |
| 2014/0314233 A1* | 10/2014 | Evans | H04N 21/83 | 380/210 |
| 2014/0321546 A1* | 10/2014 | Sakurai | H04N 13/0048 | 375/240.16 |
| 2014/0348439 A1* | 11/2014 | Han | H04N 19/62 | 382/250 |
| 2015/0010005 A1* | 1/2015 | Yoshida | H04L 45/74 | 370/392 |
| 2015/0019813 A1* | 1/2015 | Loh | G06F 12/0866 | 711/122 |
| 2015/0019834 A1* | 1/2015 | Loh | G06F 12/023 | 711/208 |
| 2015/0020135 A1* | 1/2015 | Frusina | H04N 21/4621 | 725/116 |
| 2015/0086011 A1* | 3/2015 | Kozaczuk | H04N 7/1675 | 380/200 |
| 2015/0109406 A1* | 4/2015 | Carlsson | H04N 7/147 | 348/14.13 |
| 2015/0124883 A1* | 5/2015 | Inada | H04N 19/174 | 375/240.16 |
| 2015/0163532 A1* | 6/2015 | Shmueli | H04N 21/23418 | 386/326 |
| 2015/0195532 A1* | 7/2015 | Nakagami | H04N 19/61 | 375/240.12 |
| 2015/0222917 A1* | 8/2015 | Wu | H04N 19/46 | 375/240.26 |
| 2015/0309687 A1* | 10/2015 | Herigstad | H04N 21/4126 | 715/784 |
| 2015/0319462 A1* | 11/2015 | Ramasubramonian | H04N 19/44 | 375/240.29 |
| 2015/0365676 A1* | 12/2015 | Choi | H04N 19/70 | 375/240.02 |
| 2015/0382263 A1* | 12/2015 | Jain | H04W 36/14 | 455/432.1 |
| 2016/0004642 A1* | 1/2016 | Sugimoto | G06F 3/06 | 711/128 |
| 2016/0026525 A1* | 1/2016 | Barndt | G06F 11/1068 | 714/773 |
| 2016/0050412 A1* | 2/2016 | Takehara | H04N 19/105 | 375/240.14 |
| 2016/0112394 A1* | 4/2016 | Sahu | H04L 63/102 | 726/7 |
| 2016/0117796 A1* | 4/2016 | Wu | G09G 5/39 | 345/506 |
| 2016/0125568 A1* | 5/2016 | Jeacocke | G06T 1/60 | 345/531 |
| 2016/0173906 A1* | 6/2016 | Lei | H04N 19/176 | 375/240.13 |
| 2016/0179356 A1* | 6/2016 | Baghadady | G06F 17/30058 | 715/720 |
| 2016/0191917 A1* | 6/2016 | Fu | H04N 19/13 | 375/240.07 |
| 2016/0196801 A1* | 7/2016 | Glen | G09G 5/18 | 345/213 |
| 2016/0210972 A1* | 7/2016 | Nurmukhanov | G10L 19/018 | |
| 2016/0253105 A1* | 9/2016 | Chang | G06F 3/0608 | |
| 2016/0267884 A1* | 9/2016 | Binstock | G09G 5/373 | |
| 2016/0275916 A1* | 9/2016 | Glen | G09G 5/395 | |
| 2016/0295254 A1* | 10/2016 | Chen | H04N 21/23406 | |
| 2016/0366424 A1* | 12/2016 | Wu | H04N 19/196 | |
| 2017/0076707 A1* | 3/2017 | Sakata | G10H 7/008 | |
| 2017/0214638 A1* | 7/2017 | Alsup | H04L 5/14 | |
| 2017/0220283 A1* | 8/2017 | Zhang | H04N 19/423 | |
| 2017/0251163 A1* | 8/2017 | Ochiai | H04N 5/232 | |
| 2017/0272744 A1* | 9/2017 | Liu | H04N 19/105 | |
| 2017/0295112 A1* | 10/2017 | Cheng | H04L 49/3036 | |
| 2017/0359583 A1* | 12/2017 | Thirumalai | H04N 19/127 | |
| 2018/0027039 A1* | 1/2018 | Moorthy | H04L 65/4069 | |
| 2018/0027266 A1* | 1/2018 | Schmidt | H04N 21/236 | |
| 2018/0234683 A1* | 8/2018 | Kudana | H04N 19/115 | |
| 2018/0253641 A1* | 9/2018 | Yachide | G06N 3/063 | |
| 2018/0262701 A1* | 9/2018 | Woody | H04N 5/222 | |
| 2018/0316923 A1* | 11/2018 | Stachurski | H04N 19/152 | |

OTHER PUBLICATIONS

"Multimedia Programming Guide: Using Audio", Retrieved from <https://developer.apple.com/library/ios/documentation/audiovideo/conceptual/multimediapg/usingaudio/usingaudio.html> on Oct. 8, 2014, Oct. 7, 2010, 19 pages.

"Understanding video formats", Retrieved from <http://help.adobe.com/en_US/as3/dev/WS5b3ccc516d4fbf351e63e3d118a9b90204-7d46.html> on Oct. 8, 2014, May 15, 2010, 4 pages.

"VC1080 Universal A/V to HDMI Switch with Scaler", Retrieved from <http://www.aten.com/products/Professional-Audio/Video/Converters/Universal-AV-to-HDMI-Switch-with-Scaler~VC1080.html#.VDwloBZzC5h> on Oct. 13, 2014, Jun. 25, 2014, 4 pages.

Evers,"Highest Quality HD Now Available to All Netflix Members", Retrieved from <http://blog.netflix.com/2013/09/highest-quality-hd-now-available-to-all.html> on Oct. 13, 2014, Sep. 26, 2013, 2 pages.

Paisano"How to: Convert Videos for Your iPhone (or Any Mobile Device)", Retrieved from <http://mashable.com/2008/11/12/how-to-convert-videos-for-your-iphone-or-any-mobile-device/> on Oct. 8, 2014, Nov. 12, 2008, 10 pages.

Philpott,"Adaptive Bit Rate Video Streaming: Why Delivery Will Matter More Than Codec", Retrieved from <http://mashable.com/2011/01/25/adaptive-bit-rate-video-streaming/> on Oct. 8, 2014, Jan. 25, 2011, 9 pages.

"Second Written Opinion", Application No. PCT/US2015/055051, dated Apr. 13, 2016, 5 pages.

"International Preliminary Report on Patentability", Application No. PCT/US2015/055051, dated Feb. 7, 2017, 9 pages.

(56) References Cited

OTHER PUBLICATIONS

"Office Action Issued in European Patent Application No. 15787781.
2", dated Mar. 27, 2018, 6 Pages.

* cited by examiner

BUFFER OPTIMIZATION

RELATED APPLICATION

This application claims priority to U.S. Provisional Patent Application No. 62/063,220, filed Oct. 13, 2014, and titled "Buffer Optimization," the entire disclosure of which is hereby incorporated by reference.

BACKGROUND

The functionality that is available to users of computing devices is ever increasing. One example of this increase is the ability to consume and output video by the device. To support transfer and storage of the video, the video is often compressed, which may be performed using a variety of different compression standards (e.g., codecs), such as SMPTE VC-1, H.264/AVC and HEVC/H.265. Secure decoding of encoded data streams may be accomplished by a decoder that performs decoding on behalf of consuming application. Generally, video processing and playback consumes large amounts of memory and processing power. For example, the memory and processing capabilities required for handling popular and emerging high resolution formats such as 1080p and 4K may be considerable. Consequently, some low-end devices with limited capabilities may be unable to support content in these formats due to memory limitation and other aspects. Additionally, traditional processing schemes may fail to account for differences between devices and content types, which can result in inefficient processing in some scenarios.

SUMMARY

Buffer optimization techniques are described herein in which a graphics processing system of the computing device is configured to implement and select between a plurality of buffer schemes for processing of an encoded data stream in dependence upon formats used for decoding and rendering (e.g., video format, bit depth, resolution, content type, etc.) and device capabilities such as available memory and/or processing power. Processing of an encoded data stream for decoding and display via the graphics processing system then occurs using a selected one of the buffer schemes to define buffers employed for the decoding and rendering. This may include configuring the sizes of buffers for both decoding picture buffering (DPB) and output picture buffering (OPB) in accordance with the selected scheme. The plurality of schemes may include at least one buffer scheme for processing the encoded content when the input format and the output format are the same, and a different buffer scheme for processing the encoded content when the input format and the output format are different.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Generally, video processing and playback consumes large amounts of memory and processing power, particularly with popular and emerging high resolution formats such as 1080p and 4K may be considerable. Consequently, some low-end devices with limited capabilities may be unable to support content in these formats and/or processing may be slow and/or inefficient using such device without the buffer/surface optimization.

Buffer optimization techniques are described herein in which a graphics processing system of the computing device is configured to implement and select between a plurality of buffer schemes for processing of an encoded data stream in dependence upon formats used for decoding and rendering (e.g., video format, bit depth, resolution, content type, etc.) and device capabilities such as available memory and/or processing power. Processing of an encoded data stream for display via the graphics processing system then occurs using a selected one of the buffer schemes to define buffers employed for the decoding and rendering. This may include configuring the sizes of buffers for both decoding picture buffering (DPB) and output picture buffering (OPB) in accordance with the selected scheme. The plurality of schemes may include at least one buffer scheme for processing the encoded content when the input format and the output format are the same, and a different buffer scheme for processing the encoded content when the input format and the output format are different.

Employing the buffer optimization techniques described herein enables combined management of decoding picture buffering (DPB) and output picture buffering (OPB). In addition, a variety of different buffering options may be available for selection to tailor the experience for devices having different capabilities and/or for rendering in different contexts. Memory usage may be reduced in some scenarios by selecting an appropriate buffer scheme without any degradation on visual video quality for end-users. When device capabilities support doing so, a buffer scheme designed to favor performance over resource utilization may be selected. Accordingly, a common approach that uses different buffering scheme options may be used to optimize graphics processing across a range of devices having different capabilities, content formats, bit depths, and/or processing scenarios.

In the discussion that follows, a section titled "Operating Environment" is provided and describes one environment in which one or more implementations can be employed. Following this, a section titled "Buffer Optimization Details" describes example details and procedures in accordance with one or more implementations. Last, a section titled "Example System" describes example computing systems, components, and devices that can be utilized to implement one or more implementations.

Operating Environment

Figure 1:
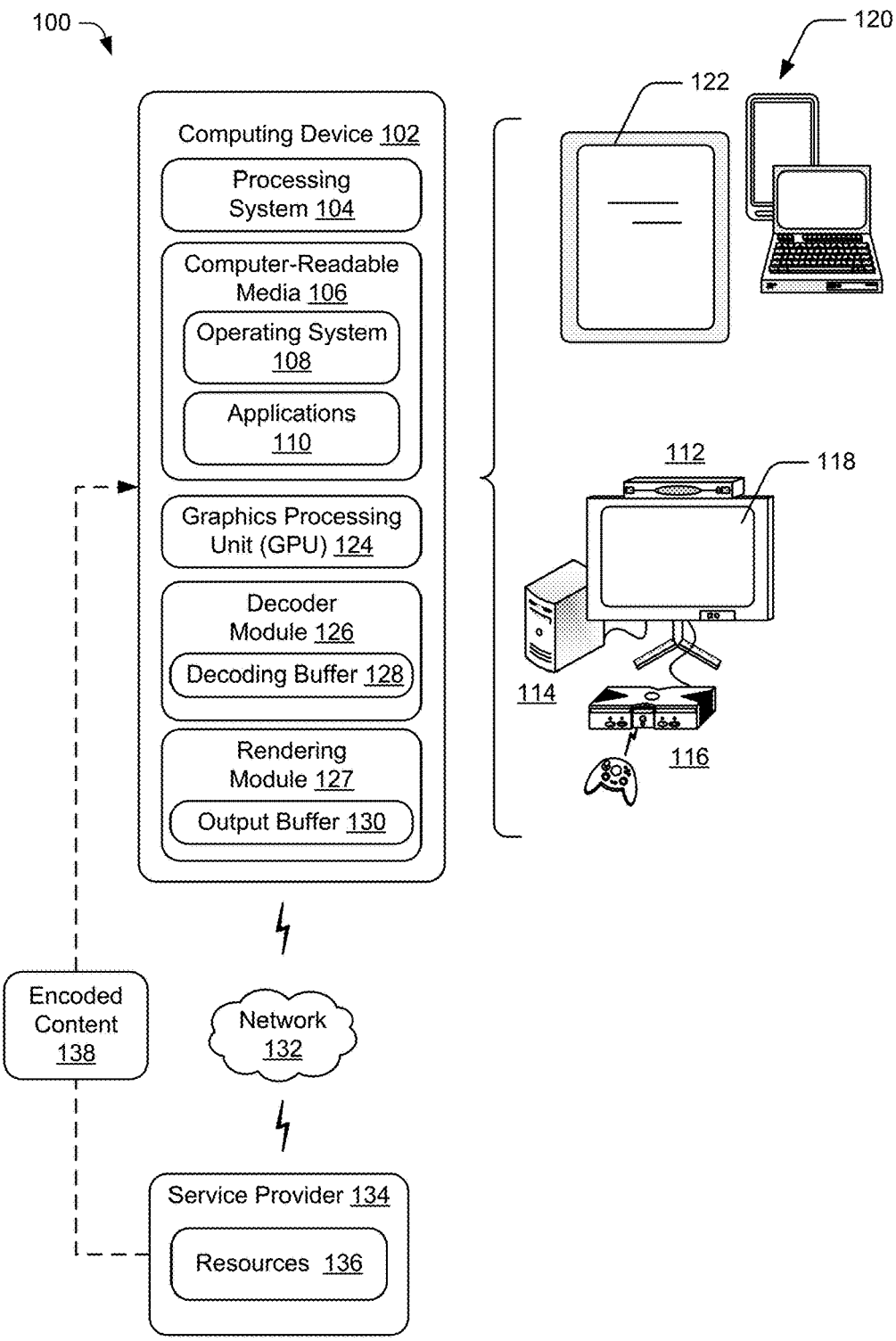
FIG. 1 illustrates an example operating environment in accordance with one or more implementations.

FIG. 1 illustrates an operating environment in accordance with one or more embodiments, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.) and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. Any of the computing devices can be implemented with various components, such as one or more processors and memory devices, as well as with any combination of differing components. One example of a computing system that can represent various systems and/or devices including the computing device 102 is shown and described below in relation to FIG. 6.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 6.

The computing device 102 may also include a graphics processing unit (GPU) 124 separate from the processing system that operates to perform various processing related to graphics output by the computing device for display on the display device 118 or integrated display 122. Alternatively, the GPU may be implemented as a component of the processing system along with other hardware, such as a CPU. The GPU 124 is a hardware component of the computing device that is dedicated to graphics processing. Functionality provided by the GPU 124 may include controlling aspects of resolution, pixel shading operations, color depth, texture mapping, 3D rendering, and other tasks associated with rendering user interfaces and images for applications. This can include processing tasks such as polygon drawing, bitmap transfers and painting, window resizing and repositioning, line drawing, font scaling, and so forth. The GPU 124 may be capable of handling these processing tasks in hardware at greater speeds than software that is executed via a CPU or other processing devices of the processing system 104. Thus, the dedicated graphics processing capability of the GPU 124 can accelerate graphics processing, reduce the workload of the processing system 104, and free up system resources for other tasks. The GPU 124 and other processing hardware (e.g., CPUs) may perform separate sequential processing of commands on different respective timelines for rendering of frames, graphics, and/or other processing tasks.

In order to handle processing tasks related to encoded content, the GPU 124 may include or otherwise make use of a decoder module 126 and rendering module 127. The decoder module 126 may represent hardware, software, firmware, fixed device logic and combinations thereof configured to provide functionality to process, decode, supply and otherwise manage encode content on behalf of the operating system 108 and other applications 110 that consume the content (e.g., "consuming applications"). The rendering module 127 may represent hardware, software, firmware, fixed device logic and combinations thereof configured to provide functionality for processing and/or sequencing of decoded content that is produced by the decoder module 126 for display, such as via a display device 118 or integrated display 122 of the computing device. In the depicted example, the decoder module 126 and rendering module 127 are illustrated as standalone software modules or hardware components, however, these modules may alternatively be combined together and/or provided as an integrated hardware components of the GPU, software components of the OS or other application, via task specific microprocessors, and so forth.

The decoder module 126 and rendering module 127 may be further configured to implement various operations and techniques for buffer optimization as described in this document. In order to do so, the decoder module 126 may include or make use of a decoding buffer 128 and the rendering module 127 may include or make use of an output buffer 130 as depicted in FIG. 1. The buffers depicted in FIG. 1 represent memory space that may be allocated in memory of the computing device 102 to facilitate processing of content. In particular, the buffers may hold packet or frame data for video content of a data stream, such as a movie accessed from an online service, a DVD, a locally stored video file, and so forth. The decoding buffer 128 is configured to hold packet or frame data associated with decoding performed by the decoder module 126, which may include reference frame data for inter frame decoding. The output buffer 130 is configured to hold packet or frame data associated with rendering performed by the rendering module 126.

Buffers may be allocated in any suitable memory of the computing device 102 including system memory, secure memory, dedicated memory of the GPU 124, and so forth. Although depicted as separate buffers, the buffers may be combined together and/or may overlap partially or completely in some scenarios. In one or more implementations, the buffers are configured and allocated in accordance with a buffer scheme that may be selected dynamically from a plurality of different buffer schemes supported by the system. Configuration of the buffers may include at least setting the size of the buffers in accordance with a selected buffer scheme. Further details regarding buffer configuration and other aspects of buffer optimization are discussed in relation to the following figures.

The environment 100 further depicts that the computing device 102 may be communicatively coupled via a network 132 to a service provider 134, which enables the computing device 102 to access and interact with various resources 136 made available by the service provider 134. The resources 136 can include any suitable combination of content and/or services typically made available over a network by one or more service providers. For instance, content can include various combinations of text, video, ads, audio, multi-media streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

By way of example, the computing device 102 may be navigated to access and download encoded content 138 from the service provider 134. The encoded content 138 may include video content, music, or other content that is protected using some form of digital rights management (DRM). Generally, encoded content 138 is encoded by an encoder on the service provider side (e.g., prior to distribution to clients) using a suitable compression standard and/or encryption format. Decoding may then occur via a decoder on the consuming side that is configured to recognize, support, and handle decoding of content that is encoded in one or more different compressions standards and/or encryption formats.

A variety of suitable compression standards and/or encryption formats for digital rights management of content may be supported by encoders and decoders including but not limited to MPEG-1, MPEG-2, MPEG-4, VP8, SMPTE VC-1, H.264/AVC, H.264/MVC, H.264/SVC, H.2645/HEVC, HEVC/H.265, and the like. Thus, in accordance with techniques described above and below, the decoder module 126 may be configured to decode encoded content 138 that is encoded using a plurality of compression standards, including one or more of the example standards enumerated herein.

Having described an example operating environment, consider now example details and techniques associated with one or more implementations of buffer optimizations.

Buffer Optimization Details

Graphics Processing System

Figure 2:
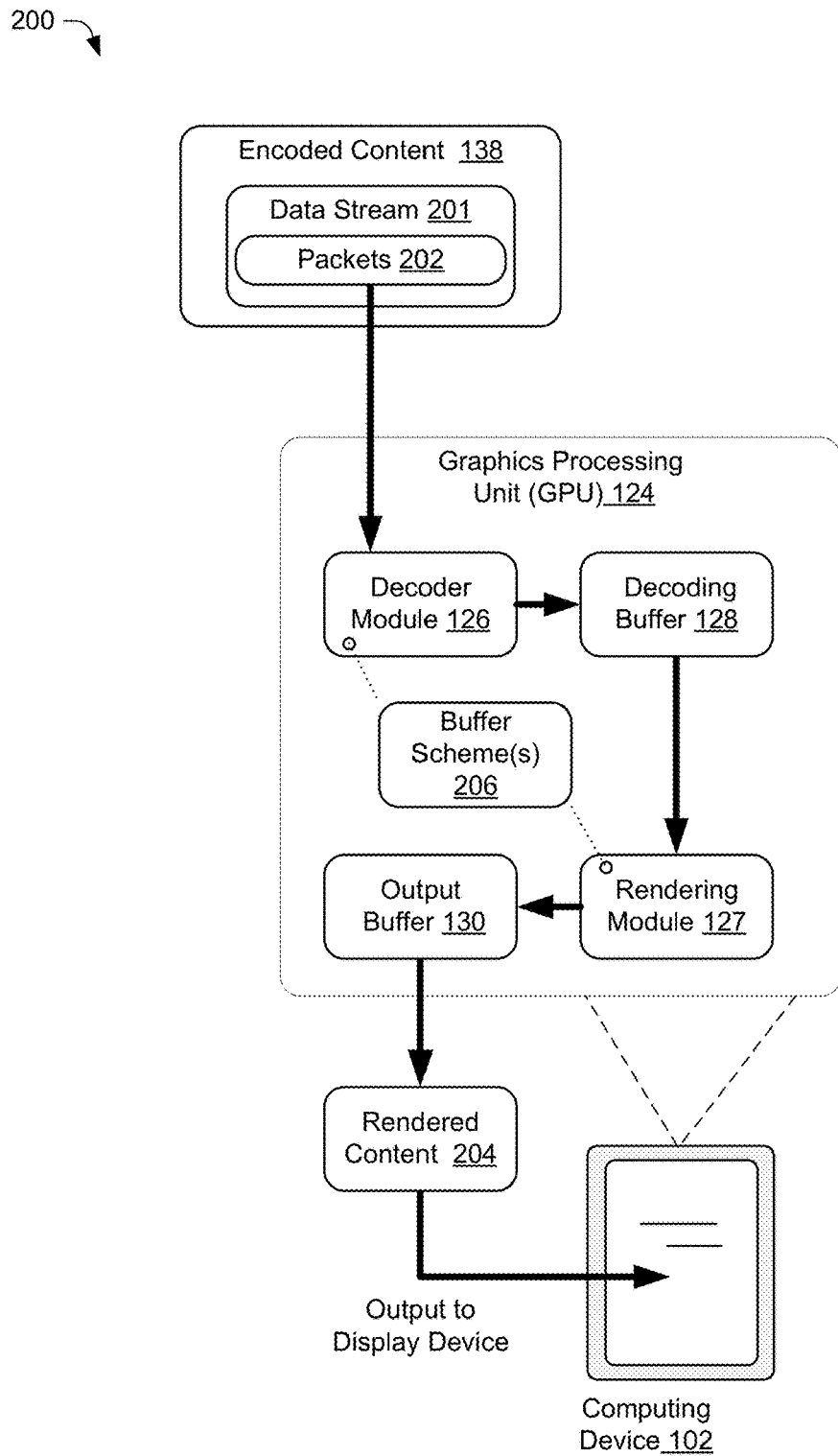
FIG. 2 is diagram depicting example details of a graphics processing system that may be provided with a computing device in accordance with one or more implementations.

FIG. 2 depicts generally at 200 details of an example graphics processing system that may be provided with a computing device 102 in accordance with one or more implementations. In this example, the decoder module 126 and rendering module 127 are illustrated as being implemented as a component of a GPU 124. In an implementation, the decoder module 126 and/or rendering module 127 may be provided by dedicated and secure hardware components integrated with the GPU 124. Other implementations are also contemplated as previously mentioned, such as a stand-alone hardware modules or implementations in software, firmware, or fixed logic device, as well as combinations of software, firmware, fixed logic device, and hardware.

In this example, a data stream 201 of encoded content 138 is represented as being received by the computing device 102 and processed using the graphics processing unit 124. The data stream 201 may include a plurality of individual packets 202 each of which may contain headers (e.g., metadata) and data portions. The headers are configured to convey information regarding the packets, such as the packet type, sequencing data, set-up parameters, format information, indications of compression standards used for encoding, indications regarding the amount and type of data contained in the packets, and other metadata, fields, and parameters that may be related to operational settings for the decoder, renderer, GPU, and/or a consuming application. The data portions of the packets represent content payloads, such as frames or "slices" of video data associated with a video data stream or audio snippet data associated with an audio stream.

In operation, the decoder module 126 is configured to handle tasks related to decoding of packets 202 of the data stream 201. This may include obtaining and responding to requests from consuming applications to access and utilize portions of the content. To do so, the decoder module 126 may make use of a decoding buffer 128 to perform decoding related operations. Decoded data may then be provided to the rendering module 127, which is configured to handle tasks related to rendering of content for output via a display of the computing device. The rendering module 127 may make use of an output buffer 128 to prepare content for output, sequence decoded content, and produce rendered content 204 for output to a display device.

As represented in FIG. 2 both the decoder module 126 and rendering module 127 may operate under the influence of buffer schemes 206 that may be dynamically selected based upon various factors. The factors may include but are not limited to input and output formats of the data stream (e.g., resolutions, encoding standard, frame rate, content type, etc.) and device capabilities including but not limited to an amount of memory available for graphics processing operations. As part of processing the encoded content 138, a selection may be made of a buffer scheme 206 to use for the processing from a plurality of buffer schemes 206 supported by the system. For example, the decoder module 126 may be configured to parse headers and/or other metadata having bitstream syntax for the encoded content that indicates the type of content, content format, resolution, and other information that may be used to set-up processing of the data stream 201 and buffers for the processing.

In one or more implementations, the bitstream syntax of the data stream may also include an indication of a designated scheme to use for processing of the content. In this case, the indication of a designated scheme may be used to identify, select, and set-up the designated scheme. In addition or alternatively, the bitstream syntax may be configured to contain data indicative of a decoding buffer size and/or an output/rendering buffer size. Accordingly, selection of a buffer scheme 206 and/or configuration of buffers may be based at least in part upon parsing of headers and/or other metadata to analyze the bitstream syntax and extract information that specifies how to set up buffering for the corresponding data stream.

The selected buffer scheme 206 may be used to manage both decoding processes and rendering processes in combination. The buffer scheme 206 represents a range of available options that may be associated with different levels of quality, memory utilization, and/or processing workloads. By selectively applying different buffer schemes in different scenarios as discussed herein, the quality, memory utilization, and/or processing workload can be tailored for different types of content and for devices having different capabilities. For example, video playback may be optimized for quality on high-end devices that have sufficient memory and processing power. Likewise, video playback may be optimized for memory usage on devices that may have limited memory and/or processing power. In general, the buffer schemes enable optimizations by dynamically changing the configuration of buffers for different scenarios. A variety of different buffer schemes 206 are contemplated, examples of which are discussed below.

Buffer Schemes

As noted previously, buffer optimization techniques may provide a variety of different buffering options that may be selectable to tailor buffer configurations for devices having different capabilities and/or for different processing contexts. The different buffering options may be implemented via a set of buffer schemes 206 that are supported by a device and/or graphics processing system of the device. Buffer schemes 206 may be selected and applied for combined management of decoding picture buffering (DPB) and output picture buffering (OPB) by selectively configuring corresponding decoding buffers 128 and output buffers 130 in accordance with a selected scheme.

Generally speaking, buffer schemes 206 may defined for both scenarios in which input format used for decoding (e.g., DPB) and output format used for rendering (e.g., OPB) are the same (e.g., same resolution, bit depth, video format, type of content) and scenarios in which the input format and output formats are different. Accordingly, one buffer scheme may be available for processing the encoded content when the input format and the output format are the same and a different buffer scheme may be available for processing the encoded content when the input format and the output format are different.

In addition or alternatively, in cases in which the input format and the output format are different, format conversion may occur either as part of decoding or as part of rendering. As such, buffer schemes 206 may be established that correspond to and/or specify when format conversion occurs in the process. In this example, three or more buffer schemes 206 may be utilized to cover the different scenarios. For example, buffer schemes 206 supported by the system may include at least a first buffer scheme for processing the encoded content when the formats used for decoding and rendering are the same, a second buffer scheme for processing the encoded content when the formats used for decoding and rendering are different and format conversion is performed as part of decoding, and a third buffer scheme for processing the encoded content when the formats used for decoding and rendering are different and format conversion is performed as part of rendering. Naturally, the number and types of different buffer schemes 206 defined may vary and are not intended to limited by the examples enumerated herein. Moreover, the graphics processing system may be configured to dynamically switch between different supported buffer schemes 206 to optimize processing in different scenarios. As noted, selection of a buffer scheme may depend upon one or a combination of the input format, output format, and/or device capabilities.

In this context, consider now some additional details and examples regarding different buffer schemes that may be employed in accordance with the techniques described herein.

DPB and OPB in the Same Format

On devices having sufficient capabilities (e.g., "high-end devices") plenty of memory and processing power may be available for video processing. In addition or alternatively, input content may have a relatively low resolution that may be handled sufficiently by available memory and computing capability of a device. In these cases, processing may occur to maintain the best possible quality and avoid conversion to a lower quality format. In other words, formats used for DPB and OPB are kept the same to the extent possible. Accordingly, at least one buffer scheme 206 may be established that is designed to optimize buffers with DPB and OPB in the same format. Since the format/resolution is the same for the input and output, common buffer surfaces may be allocated in memory and used for both decoding/reference and output/display. In other words, the decoding buffer 128 and rendering buffer 130 may partially or completely overlap in this scenario. Of course separate buffers/surfaces may also be used, but doing so make consume more memory relative to using a common buffer used for dual purposes.

The management of the unified buffers for both decoding and output may be specified at least partially via bitstream syntaxes, which may define the decoding processing, reference relationship, picture reordering and reuse, and rendering processing. Bitstream syntaxes may also specify parameters that may be used to make selections of the buffer scheme as noted previously. This may include but is not limited to specifying the size of buffers to be allocated for the processing. Various different buffer sizes may be specified depending upon the input frame/slice size, format, application, content type, and so forth. Content providers and/or application developers may configure bitstream syntaxes to control the amount of buffering on both the decoding and rendering sides. As but one illustrative example, the allocation of buffers for a situation in which DPB and OPB are in the same format may be computed as follows:

DPB size+1+(frames held by render/application), where DPB size is derived from and/or specified by bitstream syntaxes, +1 is to account for decoding of a current frame, and (frames held by render) is set according to a number of frames buffered for the rendering process DPB and OPB in the Different Formats On some devices such as mobile devices, available memory and hardware capability are limited. In this case, processing may occur to optimize memory usage and may involve conversion to a lower quality format, when necessary, such as for input content with high resolution and/or high bit depths. In other words, formats used for DPB and OPB may be different due to the device capabilities, current workload, and/or settings to specify the output resolution/quality. For example, content having high resolutions and bit depth, such as 4K resolution and 10 or 12 bit depth, may be converted to a lower resolution and lower bit depth for display on some devices, such as being converted to 720p at 8 bit depth, or another reduced resolution format.

In one approach, the decoding process is performed using the original format, i.e., original resolution and original bit depth, in order to have correct and conformant decoding. However, rendering of frames for output/display may be performed using a different format, such as a reduced resolution and/or a reduced bit depth, which can significantly reduce memory usage and computation. Again, various different buffer sizes may be specified depending upon the input frame/slice size, format, application, content type, and so forth. At least some parameters used for set-up of the buffers may be indicated via bitstream syntaxes. As noted, configuration of buffers when formats used for DPB and OPB are different may depend upon when the format conversion during processing.

As but one illustrative example, the allocation of buffers in situations in which DPB and OPB are in different format may be computed as follows:

The allocation of the decoding buffer 128 for DPB is computed as DPB size+1, where DPB size is derived from or specified by bitstream syntaxes and +1 is to account for decoding of current frame When the format conversion is done during decoding, the allocation of the rendering buffer 130 for OPB is computed as DPB size+1+(frames held by render), where DPB size is derived from or specified by bitstream syntaxes, +1 is to account for processing the current frame, and (frames held by render) is set according to a number of frames buffered for the rendering process When the format conversion is done during rendering, the allocation of the rendering buffer 130 for OPB is computed as (frames held by render), which is set according to a number of frames buffered for the rendering process In accordance with the foregoing, configuration of buffers for DPB may be determined according to analysis of bitstream syntaxes to select and set-up the buffering. Configuration of buffers for OPB is dependent on when format conversion happens. When the format conversion is done during decoding, configuration of buffers for OPB may be determined according to analysis of bitstream syntaxes for DPB operations and set-up information for the rendering and display processes. When the format conversion is done during rendering, configuration of buffers for OPB is determined according to set-up information for the rendering process.

Substantial reductions in memory usage and processing load may be achieved using the buffer schemes described herein. For example, memory usage may be reduced approximately 40 to 50% for a typical 4 K video playback when format conversion to a lower resolution is performed during decoding and may be reduced approximately 50% or more when the format conversion is performed during rendering relative to memory usage on high-end devices with high quality video playback (e.g., using the same format for input and output). Accordingly, the memory transfer bandwidth on rendering and display decreases significantly.

Consider an example in which DPB size is set to 4 by bitstream syntaxes, and 8 extra buffer surfaces are allocated for rendering purposes. Given an original resolution or 4K at 10 bit depth, and a reduced resolution format of 1080p and 8 bit depth, buffer allocations and size computations may be as follows:

When DPB and OPB are in the same format, the frame buffers are computed as noted above to allocate (4+1+8)=13 frame buffers in the same format. This gives a total size for the frame buffers of ~312 MB (e.g., 13×12×2).

When format conversion is done at decoding, the frame buffers are computed as noted above to allocate (4+1)=5 high resolution buffers and (4+1+8)=13 low resolution buffers. This gives a total size for the frame buffers of 189 MB (e.g., 5×12×2+13×3). Here, memory usage is reduced by approximately 40% relative to using the same format.

When format conversion is done at rendering, the frame buffers are computed as noted above to allocate (4+1)=5 high resolution buffers and 8 low resolution buffers. This gives a total size for the frame buffers of 144 MB (5×12×2+8×3). Here, memory usage is reduced by approximately 53% relative to using the same format.

Example Procedures

To further illustrate consider the following discussion of flow diagrams that depict example procedures in accordance with one or more implementations of buffer optimization techniques. The example procedure(s) depicted can be implemented in connection with any suitable hardware, software, firmware, or combination thereof. In at least some embodiments, the methods can be implemented by way of a suitably configured computing device, such as the example computing device 102 of FIG. 1 that includes or otherwise makes use of a GPU 124, a decoder module 126, and/or a rendering module 127.

The procedures described in this document may be implemented utilizing the previously described environment, system, devices, and components and in connection with any suitable hardware, software, firmware, or combination thereof. The procedures may be represented as a set of blocks that specify operations performed by one or more entities and are not necessarily limited to the orders shown for performing the operations by the respective blocks.

In general, functionality, features, and concepts described in relation to the examples herein may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples in this description.

Figure 3:
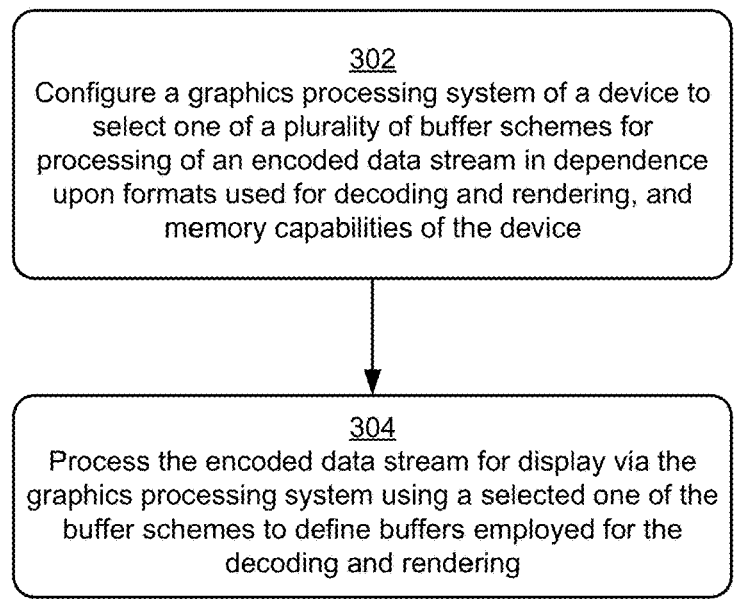
FIG. 3 is a flow diagram that describes details of an example procedure for configuring a GPU to implement buffer schemes in accordance with one or more implementations.

FIG. 3 is a flow diagram that describes details of an example procedure 300 for configuring a GPU to implement buffer schemes in accordance with one or more implementations. A graphics processing system of a device is configured to select one of a plurality of buffer schemes for processing of an encoded data stream in dependence upon formats used for decoding and rendering, and memory capabilities of the device (block 302). For example, a graphics processing system may support multiple different buffer schemes 206 as described previously. The buffer schemes 206 may be implemented via decoding and/or rendering processes corresponding to a decoder module 126 and rendering module 127 respectively. In one or more implementations, aspects of the buffer schemes may be designated via data included within the stream of content via bitstream syntaxes or otherwise. Different buffer schemes may depend upon formats used for decoding and rendering, as well as memory capabilities and or other capabilities of the device The encoded data stream is processed for display via the graphics processing system using a selected one of the buffer schemes to define buffers employed for the decoding and rendering (block 304). By way of example and not limitation, a decoder module 126 or other component of the graphics processing system may operate to select one of the buffer schemes based upon data indicative of the formats used for decoding and rendering and data that may be gathered regarding the capabilities of the device. The decoder module 126 may then implement the selected scheme to cause configuration of buffers for decoding and/or rendering as specified by the scheme. Various different schemes are contemplated, examples of which are discussed throughout this document. Processing operations for processing of the encoded data stream to decode the data into decoded portions, prepare and sequence the data for display, and communicate the content for display via a display device may occur using the buffers that are set-up in accordance with the selected scheme.

Figure 4:
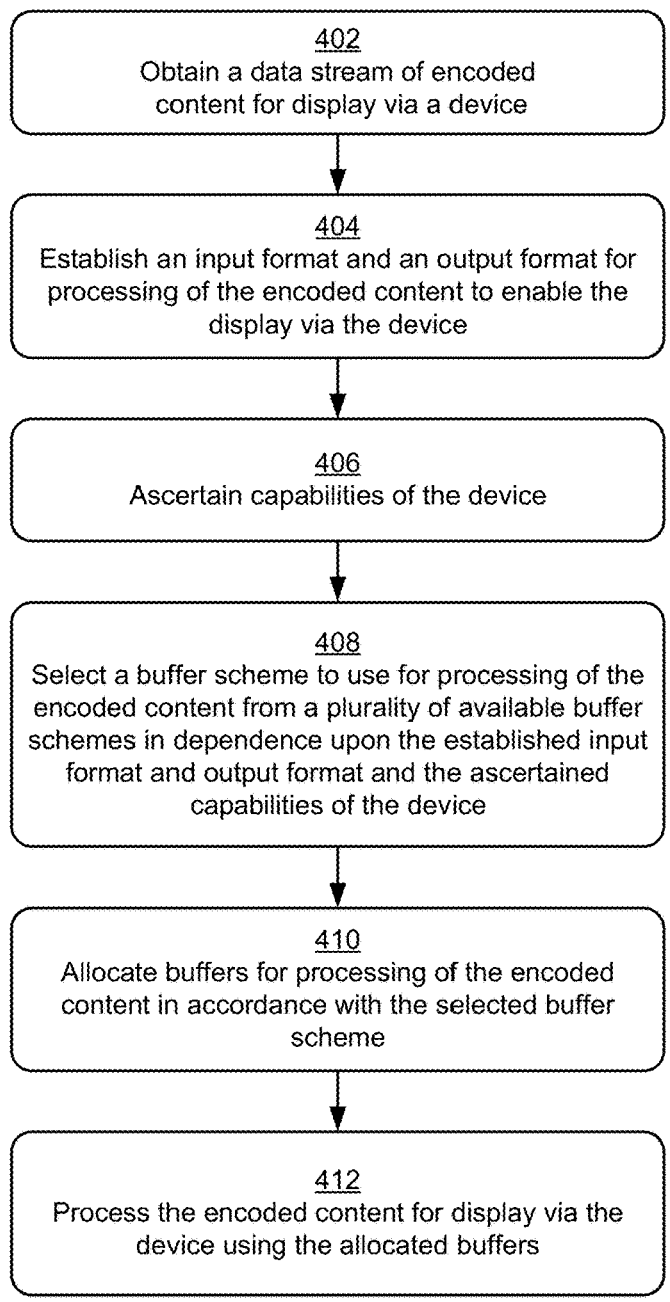
FIG. 4 is a flow diagram that describes details of an example procedure to allocate buffers using a selected buffer scheme in accordance with one or more implementations.

FIG. 4 is a flow diagram that describes details of an example procedure 400 to allocate buffers using a selected buffer scheme in accordance with one or more implementations. A data stream of encoded content for display via a device is obtained (block 402). For example, content may be obtained from a service provider 134 over a network 132, from memory associated with a computing device, from a recording on some form of computer readable media, and so forth. An input format and an output format are established for processing of the encoded content to enable the display via the device (block 404) and capabilities of the device are ascertained (block 406). As noted previously, formats to use for decoding and/or rendering may be determined by parsing of the data stream. In one approach, this involves analysis of headers and/or bitstream syntaxes to extract parameters indicative of formats to use, content types, buffer sizes and/or or other information that may be employed to set-up or select an appropriate buffering scheme. In addition, the set-up or selection of a buffer scheme may depend upon device capabilities, such as the type of display or display adapter associated with the device, amount of available memory, processing power, and so forth. In one approach, capabilities of the device may be determined through interaction with an operating system or other application of the device. In an implementation, the decoder module 126 may maintain a record of device capabilities that may be used in connection with parameters obtained through data stream parsing to select a buffer scheme and set-up buffers accordingly.

In particular, a buffer scheme is selected to use for processing of the encoded content from a plurality of available buffer schemes in dependence upon the established input format and output format and the ascertained capabilities of the device (block 408) and buffers are allocated for processing of the encoded content in accordance with the selected buffer scheme (block 410). Details regarding selection between various schemes and configuration of buffers based on supported schemes were discussed previously in relation to FIGS. 1 to 3. Once buffers are allocated, the encoded content is processed for display via the device using the allocated buffers (block 412). The processing may include decoding of the content by the decoder module 126 using the decoder buffer 128. The processing may also include sequencing and rendering of the content that is decoded by a rendering module 127 using the output buffer. Rendered content may be presented via a display device 118 or integrated display 122 as previously noted.

Figure 5:
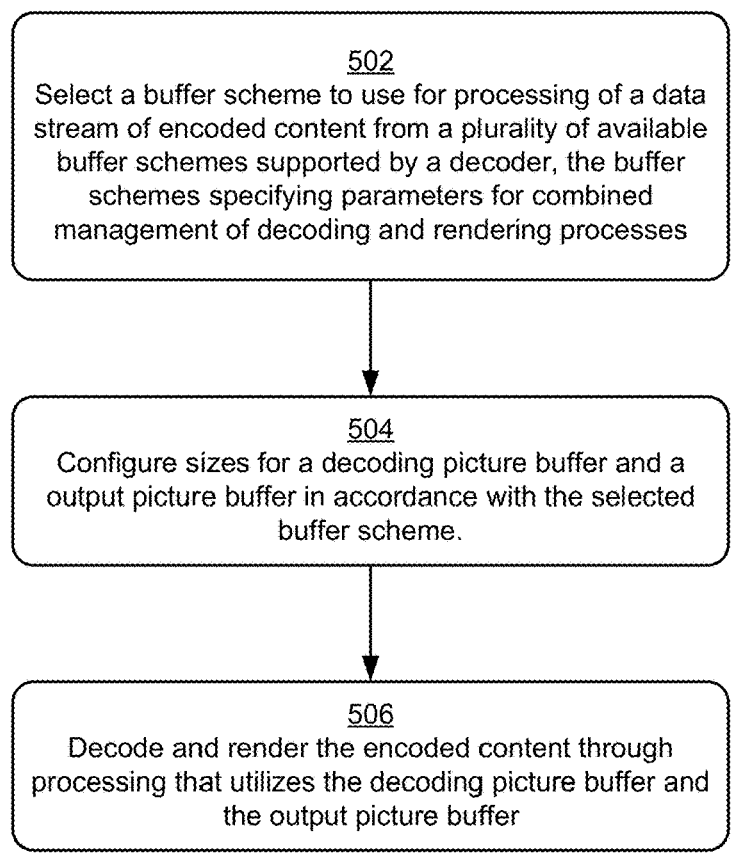
FIG. 5 is a flow diagram that describes details of an example procedure to use buffer schemes for combined management of decoding and rendering processes in accordance with one or more implementations.

FIG. 5 is a flow diagram that describes details of an example procedure 500 to use buffer schemes for combined management of decoding and rendering processes in accordance with one or more implementations. A buffer scheme to use for processing of a data stream of encoded content is selected from a plurality of available buffer schemes supported by a decoder, the buffer schemes specifying parameters for combined management of decoding and rendering processes (block 502). Various buffer schemes are contemplated as previously discussed in relation to FIGS. 1 to 4. Generally, the buffer schemes 206 may be selected and applied for combined management of decoding picture buffering (DPB) and output picture buffering (OPB), such as by selectively configuring corresponding decoding buffers 128 and output buffers 130 in accordance with a selected scheme. Buffer schemes 206 may be defined for both scenarios in which input format used for decoding (e.g., DPB) and output format used for rendering (e.g., OPB) are the same (e.g., same resolution, video format, type of content), and scenarios in which the input format and output formats are different. Each of the buffering schemes may specify parameters for combined management of decoding and rendering. The parameters associated with different buffer schemes may include different constraints for buffer sizes and/or format conversion between different input and output resolutions, as well as other information that enables configuration of buffers.

Accordingly, sizes are configured for a decoding picture buffer and an output picture buffer in accordance with the selected buffer scheme (block 504). The sizes and other characteristics for the buffers may be configured in the manner previously described using parameters specified by the selected buffer scheme. The encoded content is decoded and rendered through processing that utilizes the decoding picture buffer and the output picture buffer (block 506). The operations for decoding and rendering may be performed via a processing system of a computing devices. In one or more implementations, the processing system includes a central processing unit (CPU) and a graphics processing unit (GPU) that is separate from the central processing unit. At least part of the processing of content may occur via the GPU. In one approach, the GPU may include or make use of a decoder module to perform the decoding and a rendering module to perform the rendering. The decoder module may be configured to decode encoded content that is encoded using a plurality of compression standards including at least H.264/AVC and HEVC/H.265 standards. Either or both of the decoder module and the rendering module may be implemented as components of the graphics processing unit (GPU).

Having considered example procedures for buffer optimization, consider a discussion of an example system in accordance with one or more implementations.

Example System

Figure 6:
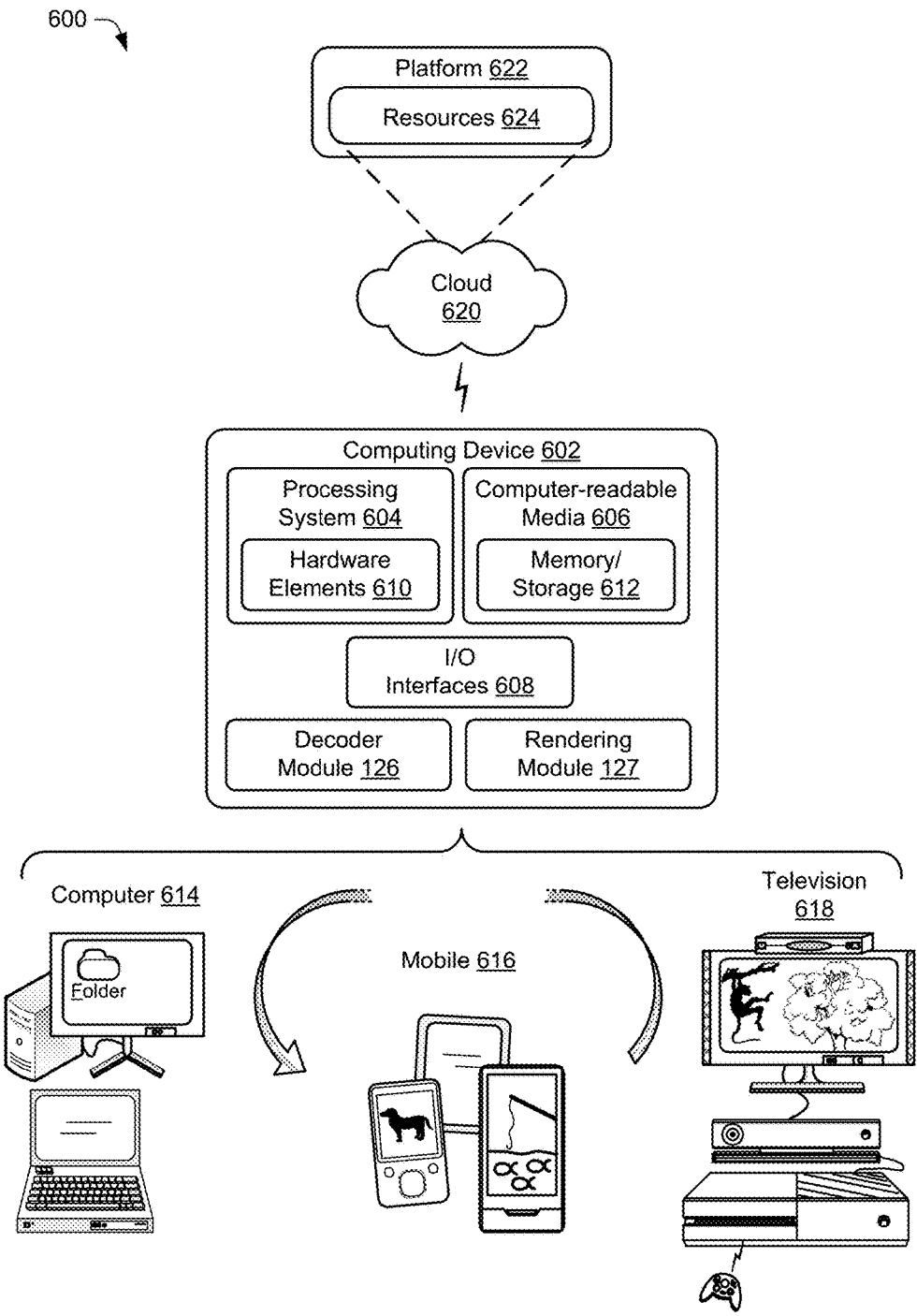
FIG. 6 is a block diagram of a system that can be employed for buffer optimization in accordance with one or more implementations.

FIG. 6 illustrates an example system 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 602, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, decoder module 126, rendering module 127, and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This is illustrated through inclusion of the decoder module 126 and rendering module 127 on the computing device 602. The functionality represented by the decoder module 126, rendering module 127, and other modules/applications may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

Example Implementations

Examples implementations of buffer optimizations described herein include, but are not limited to, one or any combinations of one of more of the following examples:

A computer-implemented method comprising: obtaining a data stream of encoded content for display via a device; establishing an input format and an output format for processing of the encoded content to enable the display via the device; ascertaining capabilities of the device; selecting a buffer scheme to use for processing of the encoded content from a plurality of available buffer schemes in dependence upon the established input format and output format and the ascertained capabilities of the device; allocating buffers for processing of the encoded content in accordance with the selected buffer scheme; and processing the encoded content for display via the device using the allocated buffers.

The computer-implemented method as described above further comprising configuring sizes for a decoding picture buffer and an output picture buffer as part of the allocating, the sizes specified by the buffer scheme that is selected.

The computer-implemented method as described above, further comprising, as part of the processing, decoding the encoded content to produce decoded content and rendering the decoded content via a graphics processing unit of the device using the allocated buffers.

The computer-implemented as described above, further comprising performing a format conversion from the input format to the output format when the input format and the output format are different, the buffer scheme that is selected configured to control whether the format conversion occurs as part of decoding or as part of rendering.

The computer-implemented as described above, further comprising, as part of the ascertaining, determining an amount of memory of the device available for processing of the encoded content.

The computer-implemented as described above, further comprising parsing bitstream syntax of the encoded content to identify a designated scheme and selecting the designated scheme as part of the selecting the buffer scheme.

The computer-implemented as described above, further comprising setting the output format such that at least one of a resolution or bit depth is lower than a corresponding resolution or bit depth of the input format to reduce memory usage responsive to determining that memory available via the device is insufficient to use a resolution or a bit depth associated with the input format for the output format.

The computer-implemented as described above, wherein the plurality of available buffer schemes include at least: one buffer scheme for processing the encoded content when the input format and the output format are the same; and a different buffer scheme for processing the encoded content when the input format and the output format are different.

One or more computer-readable storage media storing instructions that, when executed by a computing device, cause the computing device to perform operations comprising: configuring a graphics processing system of the computing device to select one of a plurality of buffer schemes for processing of an encoded data stream in dependence upon formats used for decoding and rendering, and memory capabilities of the device; and processing the encoded data stream for display via the graphics processing system using a selected one of the buffer schemes to define buffers employed for the decoding and rendering.

One or more computer-readable storage as described above, wherein plurality of buffer schemes include at least: a first buffer scheme for processing the encoded content when the formats used for decoding and rendering are the same; a second buffer scheme for processing the encoded content when the formats used for decoding and rendering are different and format conversion is performed as part of decoding; and a third buffer scheme for processing the encoded content when the formats used for decoding and rendering are different and format conversion is performed as part of rendering.

One or more computer-readable storage as described above, wherein the encoded data stream includes video content and the formats used for decoding and rendering comprise resolutions for the video content.

One or more computer-readable storage media as described above, wherein one or more of the plurality of available buffer schemes is configured to define separate buffers for decoding and rendering for allocation in memory of the computing device.

One or more computer-readable storage media as described above, wherein at least one of the plurality of available buffer schemes is configured to define a common buffer employed for both decoding and rendering for allocation in memory of the computing device.

One or more computer-readable storage media as described above, wherein each of plurality of available buffer schemes is configured to define sizes for the buffers employed for the decoding and rendering based upon one or a combination of: a decoding buffer size specified by bitstream syntax of the encoded content, a size reserved for decoding of a current image, or a number of images buffered for rendering.

A system comprising: a processing system; one or more modules operable via the processing system to perform operations for processing of a data stream of encoded content for display via a display device associated with the system, including operations to: select a buffer scheme to use for processing of a data stream of encoded content from a plurality of available buffer schemes supported by the system, the buffer schemes specifying parameters for combined management of decoding and rendering; configure sizes for a decoding picture buffer and a output picture buffer in accordance with the selected buffer scheme; and decode the encoded content and render decoded content through processing that utilizes the decoding picture buffer and the output picture buffer.

The system as described above, wherein the plurality of available buffer schemes supported by the system include one or more of: a buffer scheme for processing the encoded content when an input format and an output format are the same; a buffer scheme for processing the encoded content when the input format and the output format are different and format conversion is performed as part of decoding; and a buffer scheme for processing the encoded content when the input format and the output format are different and format conversion is performed as part of rendering.

The system as described above, wherein the parameters for combined management of decoding and rendering associated with different buffer schemes include different constraints for buffer sizes and format conversion between different input and output resolutions.

The system as described above, wherein the processing system comprises a central processing unit (CPU) and a graphics processing unit (GPU) that is separate from the central processing unit.

The system as described above, wherein the one or more modules include a decoder module to perform the decoding and a rendering module to perform the rendering implemented as components of the graphics processing unit (GPU).

The system as described above, wherein the decoder module is configured to decode encoded content that is encoded using a plurality of compression standards including at least H.264/AVC and HEVC/H.265 standards.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
obtaining a data stream of encoded content for display via a device;
establishing an input format and an output format for processing of the encoded content to enable the display via the device, the input format used for decoding the encoded content includes an original resolution of the encoded content and the output format used for rendering decoded content includes a render resolution of the decoded content for the display;
ascertaining capabilities of the device;
selecting a buffer scheme to use for processing of the encoded content from a plurality of available buffer schemes in dependence upon the established input format and output format and the ascertained capabilities of the device, the plurality of available buffer schemes include at least one buffer scheme for processing the encoded content when the input format and the output format are the same and a different buffer scheme for processing the encoded content when the input format and the output format are different;
allocating buffers for processing of the encoded content in accordance with the selected buffer scheme, the allocating comprising configuring a first size of a decoding picture buffer based on a specific decoding buffer size as indicated in the encoded content, wherein the first size of the decoding picture buffer is set by a content provider based on an input frame size, content format, and content type; and
processing the encoded content for display via the device using the allocated buffers.

2. The computer-implemented method of claim 1, further comprising configuring a second size of an output picture buffer based on a specific output buffer size as indicated in the encoded content as part of the allocating.

3. The computer-implemented method of claim 2, wherein the decoding the encoded content produces the decoded content and the rendering the decoded content being performed via a graphics processing unit of the device using the allocated buffers.

4. The computer-implemented method of claim 3, further comprising performing a format conversion from the input format to the output format when the input format and the output format are different, the buffer scheme that is selected configured to control whether the format conversion occurs as part of the decoding or as part of the rendering.

5. The computer-implemented method of claim 1, further comprising, as part of the ascertaining, determining an amount of memory of the device available for processing of the encoded content.

6. The computer-implemented method of claim 1, further comprising parsing bitstream syntax of the encoded content to identify a designated scheme and selecting the designated scheme as part of the selecting the buffer scheme.

7. The computer-implemented method of claim 1, further comprising setting the output format such that at least one of the render resolution or a render bit depth is lower than the original resolution or an original bit depth of the input format to reduce memory usage responsive to determining that memory available via the device is insufficient to use the original resolution or the original bit depth associated with the input format for the output format.

8. The computer-implemented method of claim 1, wherein one or more of the plurality of available buffer schemes correspond to separate buffers for the decoding and the rendering for allocation in memory of the device.

9. One or more computer-readable storage media storing instructions that, when executed by a computing device, cause the computing device to perform operations comprising:
configuring a graphics processing system of the computing device to select one of a plurality of buffer schemes for processing of an encoded data stream in dependence upon an input format used for decoding and an output format used for rendering decoded content, and memory capabilities of the device, the input format including an original resolution of the encoded data stream and the output format including a render resolution of the decoded content for display, the plurality of buffer schemes including at least a first buffer scheme for processing the encoded data stream when the input format and the output format are the same and a second buffer scheme for processing the encoded data stream when the input format and the output format are different;
processing the encoded data stream for display via the graphics processing system using a selected one of the plurality of buffer schemes to define buffers employed for the decoding and the rendering; and
implementing the selected one of the plurality of buffer schemes to cause configuration of a decoding picture buffer, the implementing of the selected one of the plurality of buffer schemes comprising calculating, via the graphics processing system, a size of the decoding picture buffer based on (i) a decoding buffer size as indicated in the encoded data stream and (ii) a number of frames buffered for the rendering, wherein the decoding buffer size is a set by a content provider based on an input frame size, content format, and content type.

10. One or more computer-readable storage media of claim 9, wherein format conversion is performed as part of the decoding for the second buffer scheme, the plurality of buffer schemes further including:
a third buffer scheme for processing the encoded data stream when the input format used for the decoding and the output format used for the rendering are different and the format conversion is performed as part of the rendering.

11. One or more computer-readable storage media of claim 9, wherein the encoded data stream includes video content and the input format used for the decoding further including an original bit depth for the video content and the output format used for the rendering further including a render bit depth for the video content.

12. One or more computer-readable storage media of claim 9, wherein one or more of the plurality of buffer schemes is configured to define separate buffers for the decoding and the rendering for allocation in memory of the computing device.

13. One or more computer-readable storage media of claim 9, wherein at least one of the plurality of buffer schemes is configured to define a common buffer employed for both the decoding and the rendering for allocation in memory of the computing device.

14. A system comprising:
a processing system;
one or more modules operable via the processing system to perform operations for processing of a data stream of encoded content for display via a display device associated with the system, including operations to:
select a buffer scheme to use for processing of the data stream of the encoded content from a plurality of available buffer schemes supported by the system in dependence upon an input format used for decoding the encoded content and an output format used for rendering decoded content, the plurality of available buffer schemes specifying parameters for combined management of the decoding and the rendering, the input format including an original resolution of the encoded content and the output format including a render resolution of the decoded content for the display, the plurality of available buffer schemes including at least one buffer scheme for processing the encoded content when the input format and the output format are the same and a different buffer scheme for processing the encoded content when the input format and the output format are different;
calculate sizes for a decoding picture buffer and an output picture buffer based on (i) a decoding buffer size and an output buffer size as indicated in the encoded content and (ii) a number of frames buffered for the rendering, wherein the decoding buffer size and the output buffer size are set by a content provider base on an input frame size, content format, and content type; and
decode the encoded content and render the decoded content through processing that utilizes the decoding picture buffer and the output picture buffer.

15. The system of claim 14, wherein format conversion is performed as part of the decoding for the different buffer scheme and the plurality of available buffer schemes further including:
another buffer scheme for processing the encoded content when the input format and the output format are different and format conversion is performed as part of the rendering.

16. The system of claim 14, wherein the parameters for combined management of the decoding and the rendering associated with each of the plurality of available buffer schemes include different constraints for buffer sizes and format conversion between the original resolution of the encoded content and the render resolution of the decoded content.

17. The system of claim 14, wherein the processing system comprises a central processing unit (CPU) and a graphics processing unit (GPU) that is separate from the central processing unit.

18. The system of claim 17, wherein the one or more modules include a decoder module to perform the decoding and a rendering module to perform the rendering implemented as components of the graphics processing unit (GPU).

19. The system of claim 18, wherein the decoder module is configured to decode encoded content that is encoded using a plurality of compression standards including at least H.264/AVC and HEVC/H.265 standards.

* * * * *